(12) United States Patent
Jeong et al.

(10) Patent No.: US 10,623,124 B2
(45) Date of Patent: Apr. 14, 2020

(54) RECEIVER AND DECODING METHOD THEREOF

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Hong-sil Jeong, Suwon-si (KR); Sang-hyo Kim, Seongnam-si (KR); Jong-hwan Kim, Suwon-si (KR); Hyun-jae Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 153 days.

(21) Appl. No.: 15/085,414

(22) Filed: Mar. 30, 2016

(65) Prior Publication Data
US 2016/0373201 A1 Dec. 22, 2016

(30) Foreign Application Priority Data
Jun. 22, 2015 (KR) .................. 10-2015-0088181

(51) Int. Cl.
*H04L 1/00* (2006.01)
*H04J 11/00* (2006.01)

(52) U.S. Cl.
CPC .......... *H04J 11/004* (2013.01); *H04L 1/0005* (2013.01); *H04L 1/0048* (2013.01); *H04L 1/0003* (2013.01); *H04L 1/0009* (2013.01)

(58) Field of Classification Search
CPC .... H04J 11/004; H04L 1/0003; H04L 1/0005; H04L 1/0009; H04L 1/0048
See application file for complete search history.

(56) References Cited

U.S. PATENT DOCUMENTS

| 2004/0205105 A1 | 10/2004 | Larsson et al. |
| 2007/0195907 A1 | 8/2007 | Wang et al. |
| 2008/0273512 A1 | 11/2008 | Attar et al. |

(Continued)

FOREIGN PATENT DOCUMENTS

| EP | 1892860 A2 | 2/2008 | |
| EP | 3051726 B1 * | 9/2017 | ........... H04B 1/1027 |

OTHER PUBLICATIONS

Search Report dated Jul. 1, 2016, issued by the International Searching Authority in counterpart International Patent Application No. PCT/KR2016/003372 (PCT/ISA/210).

(Continued)

*Primary Examiner* — Andrew Lai
*Assistant Examiner* — M Mostazir Rahman
(74) *Attorney, Agent, or Firm* — Sughrue Mion, PLLC

(57) ABSTRACT

A receiver and method of signal processing are provided. The receiver includes: an antenna configured to receive superposition coding signals from a plurality of base stations, and a signal processor configured to decode the superposition coding signals in modulation and coding scheme (MCS) block units of a plurality of layer signals constituting each of the superposition coding signals according to whether reception powers of the superposition coding signals satisfy a preset condition.

11 Claims, 11 Drawing Sheets

(56) References Cited

U.S. PATENT DOCUMENTS

| | | | |
|---|---|---|---|
| 2009/0296662 A1 | 12/2009 | Laroia et al. | |
| 2010/0027456 A1* | 2/2010 | Onggosanusi | H04B 7/024 370/312 |
| 2010/0220663 A1* | 9/2010 | Sawahashi | H04L 1/0003 370/329 |
| 2016/0241282 A1* | 8/2016 | Sano | H04B 1/1027 |

OTHER PUBLICATIONS

Written Opinion dated Jul. 1, 2016, issued by the International Searching Authority in counterpart International Patent Application No. PCT/KR2016/003372 (PCT/ISA/237).
Communication dated Oct. 28, 2019 issued by the Mexican Patent Office in counterpart Mexican Application No. MX/a/2017/016704.

* cited by examiner

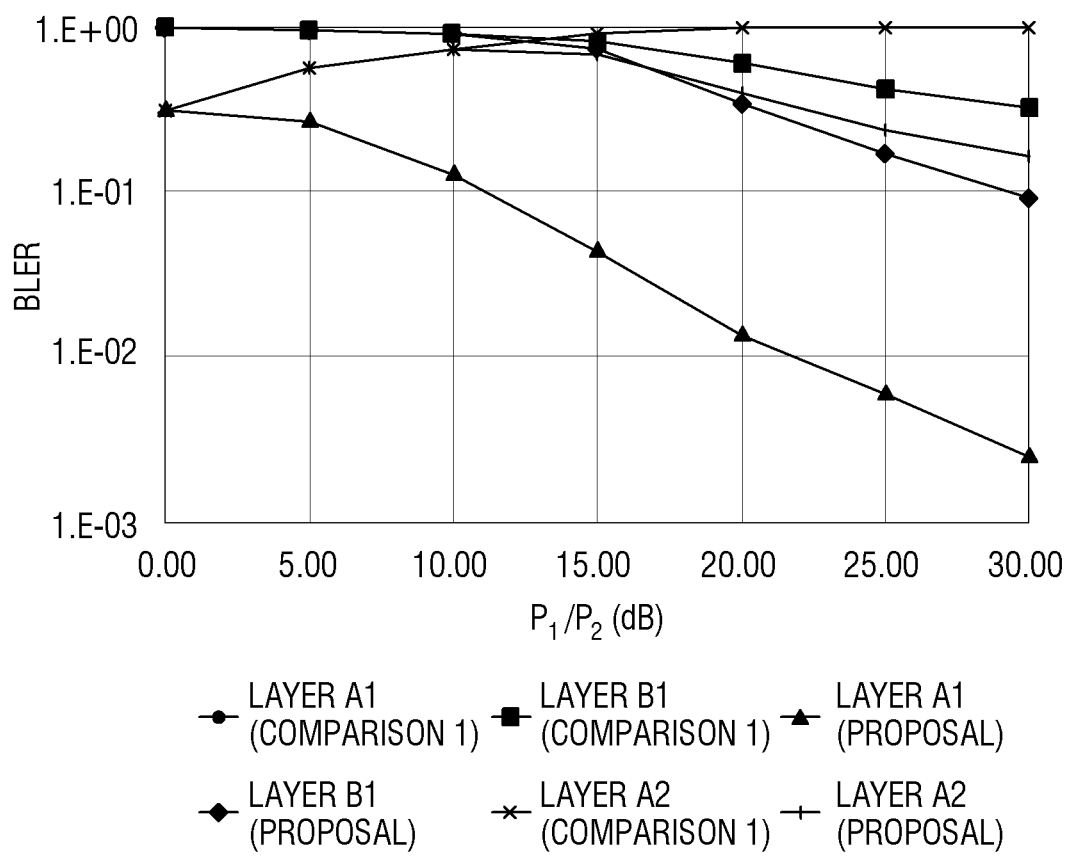

PERFORMING DECODING FROM LAYER OF
BS HAVING LARGE RECEPTION POWER

RECEIVER AND DECODING METHOD THEREOF

CROSS-REFERENCE TO THE RELATED APPLICATIONS

This application claims priority from Korean Patent Application No. 10-2015-0088181, filed on Jun. 22, 2015, in the Korean Intellectual Property Office, the disclosure of which is incorporated herein by reference in its entirety.

BACKGROUND

1. Field

Apparatuses and methods consistent with exemplary embodiments relate to signal processing, and more particularly, to a receiver which receives a signal generated through superposition coding and decodes the received signal, and a decoding method thereof.

2. Description of the Related Art

In the related art, a signal generated through superposition coding (hereinafter, referred to as superposition coding signal) may be decoded through a successive interference cancellation (SIC) decoding method.

However, the SIC decoding method may be suitable for decoding a superposition decoding signal only when the superposition coding signal is received in a single base station environment, and may be difficult to be directly applied when a plurality of superposition coding signals are received from multiple base stations.

That is, since two or more channel paths are formed between a transmitter and a receiver in the multiple base station environment, the decoding success rate of each of the layer signals of a superposition coding signal may be affected by different fading channels, a distance between the transmitter and the receiver, and the like.

Thus, there is a need for a method for efficiently decoding the superposition coding signal in the multiple base station environment.

SUMMARY

The exemplary embodiments provided herein may overcome the above disadvantages and other disadvantages not described above. However, the exemplary embodiments are not required to overcome the disadvantages described above, and may not overcome any of the problems described above.

The exemplary embodiments provide a receiver which performs decoding on superposition coding signals in modulation and coding scheme (MCS) block units in a multiple base station environment, and a decoding method thereof.

According to an aspect of an exemplary embodiment, there is provided a receiver which may include: an antenna configured to receive superposition coding signals from a plurality of base stations; and a signal processor configured to decode the superposition coding signals in MCS block units of a plurality of layer signals constituting in each of the superposition coding signals according to whether reception powers of the superposition coding signals satisfy a preset condition.

In response to reception powers of at least two superposition coding signals among the superposition coding signals received from the plurality of base stations being greater than or equal to a preset threshold value, the signal processor may determine an order of MCS blocks of a plurality of layer signals, constituting each of the at least two superposition coding signals, to be decoded based on signal to interference ratios (SIRs) of the MCS blocks, and decode the MCS blocks according to the determined order.

The MCS blocks may be blocks generated by coding and modulating bits transmitted from a transmitter according to a predetermined coding and modulation scheme.

The signal processor may calculate SIR margins of the MCS blocks, and decode on the MCS blocks in an order of a size of an SIR margin of each MCS block.

The SIR margins may be a difference between a reception SIR of an MCS block and a minimum SIR required for decoding the MCS block.

The signal processor may calculate the SIR margin based on Equation 1.

In response to a reception power of any one of the superposition coding signals being greater than or equal to a preset threshold value and reception powers for remaining superposition coding signals being less than the preset threshold value, the signal processor may decode a layer signal having a relatively high power among a plurality of layer signals constituting the superposition coding signal having the reception power greater than or equal to the preset threshold value, and subsequently decode a layer signal having a relatively low power.

According to another aspect of an exemplary embodiment, there is provided a receiver which may include: an antenna configured to receive superposition coding signals from a plurality of base stations, each superposition coding signal comprising an upper layer signal and a lower layer signal having different reception powers; and a signal processor configured to decode the superposition coding signals based on a magnitude of a reception power of each of the superposition coding signals and a magnitude of a reception power of each of the upper and lower layer signals of each of the superposition coding signals.

Each of the upper and lower layer signals may include a plurality of modulation and coding scheme (MCS) blocks, and the signal processor may decode the MCS blocks in an order set according to a signal to interference ratio (SIR) of each of the MCS blocks.

The signal processor may decode an MCS block having a large SIR margin prior to an MCS block having a small SIR margin, among the MCS blocks. Here, an SIR margin of an MCS block is a difference between a reception SIR of the MCS block and a minimum SIR required for decoding the MCS block, and the MCS blocks may include bit groups having different coding and modulation schemes, respectively.

According to an aspect of an exemplary embodiment, there is provided a decoding method of a receiver which may include: receiving superposition coding signals from a plurality of base stations; and decoding the superposition coding signals in MCS block units of a plurality of layer signals constituting each of the superposition coding signals according to whether reception powers of the superposition coding signals satisfy a preset condition.

The decoding the superposition coding signals may include: in response to reception powers of at least two superposition coding signals among the superposition coding signals received from the plurality of base stations being greater than or equal to a preset threshold value, determining an order of MCS blocks of a plurality of layer signals, constituting each of the at least two superposition coding signals, to be decoded based on signal to interference ratios (SIRs) of the MCS blocks; and decoding the MCS blocks according to the determined order.

The decoding the superposition coding signals may include calculating SIR margins of the MCS blocks; and decoding the MCS blocks in an order of a size of an SIR margin of each MCS block.

The SIR margin may be a difference between a reception SIR of an MCS block and a minimum SIR required for decoding the MCS block. The MCS blocks may include bit groups having different coding and modulation characteristics, respectively.

The decoding the superposition coding signals may include: in response to a reception power of any one of the superposition coding signals being greater than or equal to a preset threshold value and reception powers for remaining superposition coding signals being less than the preset threshold value, decoding a layer signal having a relatively high power among a plurality of layer signals constituting the superposition coding signal having the reception power greater than or equal to the preset threshold value; and subsequently decoding a layer signal having a relatively low power.

According to various exemplary embodiments, a good decoding success rate for superposition coding signals under a multiple base station environment may be obtained.

BRIEF DESCRIPTION OF THE DRAWING FIGURES

The above and/or other aspects of the inventive concept will be more apparent by describing certain exemplary embodiments with reference to the accompanying drawings, in which.

DETAILED DESCRIPTION OF THE EXEMPLARY EMBODIMENTS

Figure 1A:
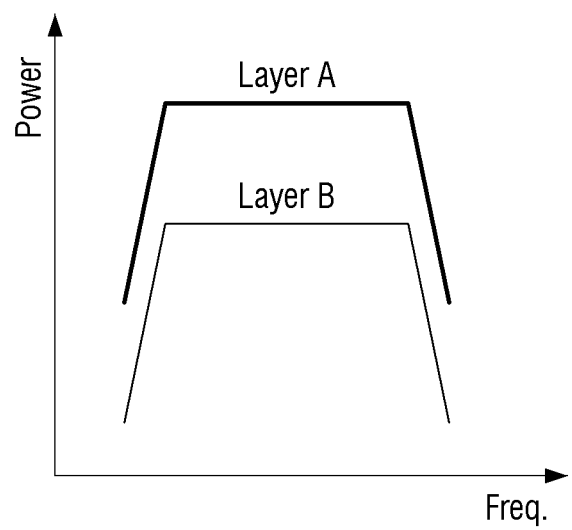
FIGS. 1A and 1B are diagrams illustrating an example of a superposition coding signal, according to an exemplary embodiment.

Hereinafter, the exemplary embodiments of the inventive concept are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

A receiver according to an exemplary embodiment may receive a superposition coding signal, and then, generate or restore original signals prior to superposition coding which generated the superposition coding signal.

The phrase "superposition coding" may refer to a coding method that superimposes or overlaps signals configured of the same data or different data to have different powers. A signal having a relatively high power in the superposition coding signal may constitute an upper layer, and a signal having a relatively low power in the superposition coding signal may constitute a lower layer such as a base layer.

A transmitter (not shown) may generate the superposition coding signal and transmit the generated superposition coding signal to the receiver through a base station.

For example, the transmitter may generate an upper layer signal and a base layer signal by coding and modulating bits which may include a payload or a message, and generate the superposition coding signal by controlling powers of the upper layer signal and the base layer signal and overlapping the upper layer signal and the base layer signal.

In this example, the generated superposition coding signal may be illustrated in FIG. 1A.

Referring to FIG. 1A, it can be seen that a Layer A (that is, an upper layer) signal which uses the same bandwidth as a Layer B (that is, a base layer) signal may be transmitted with a power larger than a power of the Layer B signal.

Thus, indoor coverage and outdoor coverage for the upper and base layer signals may be changed.

Figure 1B:
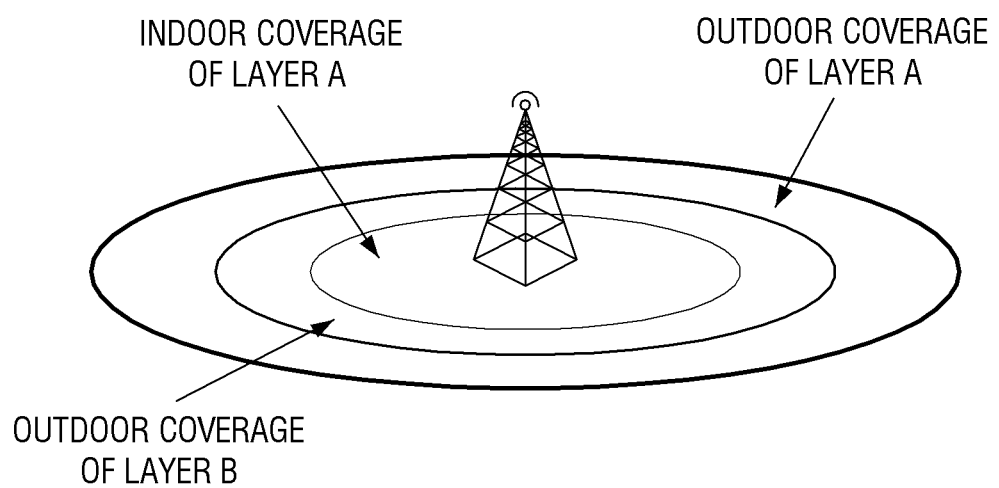

For example, as illustrated in FIG. 1B, the Layer A signal may have the power and reception stability sufficient to be received indoor and outdoor, but the Layer B signal may have only an outdoor coverage region since the Layer B signal is transmitted with the relatively lower power.

The receiver according to an exemplary embodiment may be located in a multiple base station environment. That is, the receiver may receive superposition coding signals from the multiple base stations.

Figure 2:
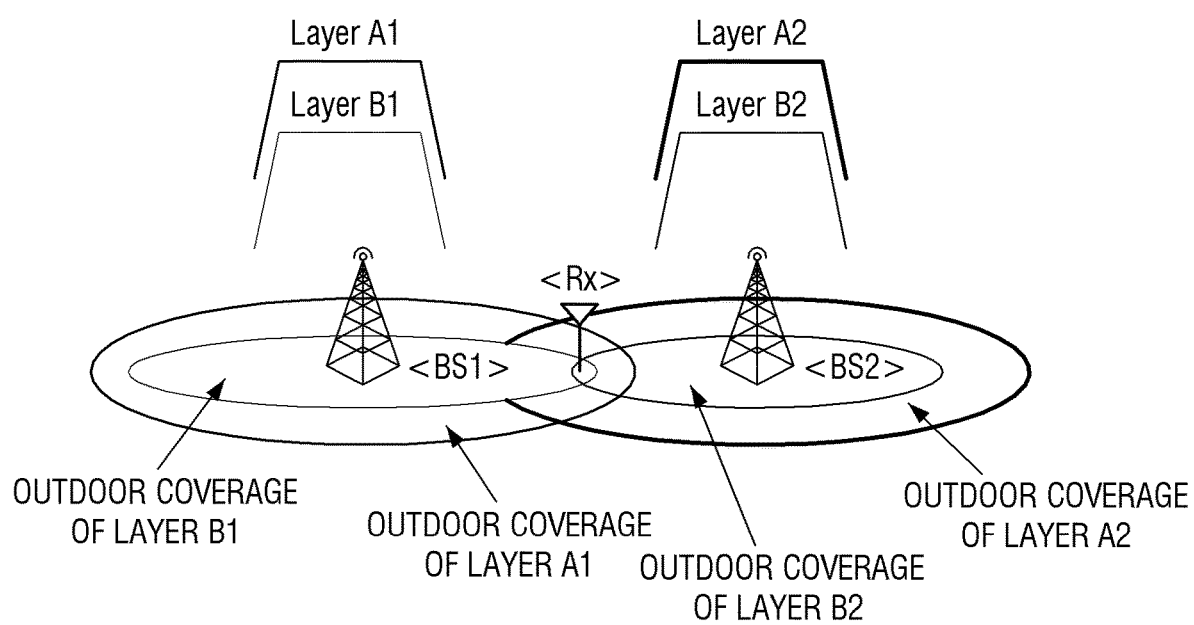
FIG. 2 is a diagram illustrating a multiple base station environment, according to an exemplary embodiment.

For example, as illustrated in FIG. 2, a receiver Rx may be located within coverage of a first base station BS1 and a second base station BS2. The receiver Rx may receive a superposition coding signal configured of a Layer A1 signal and a Layer B1 signal from the first base station BS1, and receive a superposition coding signal configured of a Layer A2 signal and a Layer B2 signal from the second base station BS2. Accordingly, the receiver Rx may receive total four layer signals.

Hereinafter, a method of efficiently decoding superposition coding signals received from multiple base stations will be described in detail.

Figure 3:
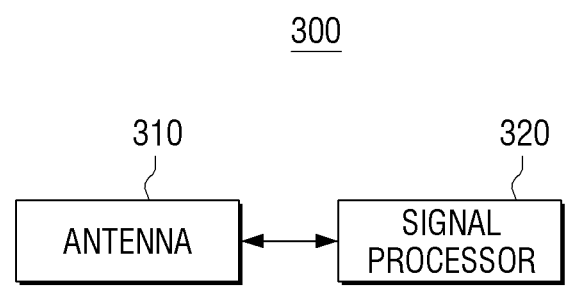
FIG. 3 is a block diagram illustrating a configuration of a receiver, according to an exemplary embodiment.

FIG. 3 is a block diagram illustrating a configuration of a receiver, according to an exemplary embodiment.

Referring to FIG. 3, a receiver 300 may include an antenna 310 and a signal processor 320.

The antenna 310 may receive superposition coding signals from a plurality of base stations. That is, the receiver 300 may receive the superposition coding signals transmitted from the plurality of base stations when the receiver 300 is located within coverage of the plurality of base stations.

The signal processor 320 may perform decoding on the superposition coding signals received through the antenna 310.

The signal processor 320 may perform decoding on the superposition coding signals through different methods according to whether reception powers of the superposition coding signals satisfy a preset condition.

Whether the reception power satisfies the preset condition may be determined according to whether reception powers of at least two or more superposition coding signals among the superposition coding signals received from the plurality of base stations satisfy a preset threshold value or more.

That is, if the receiver 300 is located in a region in which coverage of at least two base stations among the plurality of base stations overlap with each other, the receiver 300 may receive the superposition coding signals having certain intensities from the at least two base stations.

If reception powers of the superposition coding signals received from the at least two base stations are greater than or equal to the preset threshold value, the signal processor 320 may perform decoding on the superposition coding signals received from the at least two base stations on an assumption of a multiple base station environment.

If the receiver 300 is located adjacent to one of the plurality of base stations, an intensity of a superposition coding signal received from the adjacent base station may be strong, but an intensity of superposition coding signals received from the other base stations may be weak.

If a reception power of any one of the superposition coding signals received from the plurality of base stations is greater than or equal to the preset threshold value, but if reception powers of the remaining superposition coding signals are less than the preset threshold value, the signal processor 320 may process the superposition coding signals having the reception powers less than the preset threshold value as noise and perform decoding on only the superposition coding signal having the reception power greater than or equal to the preset threshold value on an assumption of a single base station environment.

Hereinafter, a method of performing decoding on a superposition coding signal will be described in detail.

If reception powers for superposition coding signals received from a plurality of base stations do not satisfy the preset condition, the signal processor 320 may perform decoding on the superposition coding signals through the following method.

For example, if a reception power for any one of the superposition coding signals received from the plurality of base stations is greater than or equal to the preset threshold value and the reception powers of the remaining superposition coding signals are less than the preset threshold value, the signal processor 320 may perform decoding on a layer signal having a relatively high power among a plurality of layer signals constituting the superposition coding signal having the reception power greater than or equal to the preset threshold value, and then perform decoding on a layer signal having a relatively low power among the plurality of layer signals.

That is, the signal processor 320 may remove the superposition coding signals having the reception powers less than the preset threshold value by processing these signals as noise, and perform decoding on the superposition coding signal having the reception power greater than or equal to the preset threshold value using a successive interference cancellation (SIC) decoding method.

The SIC decoding method may refer to a method that, in decoding a superposition coding signal, decodes a layer signal having a relatively high decoding success rate among the plurality of layer signals constituting a superposition coding signal, and then decodes a layer signal having a relatively low decoding success rate in the superposition coding signal from which the decoded layer signal is removed.

The layer signal having the relatively high decoding success rate may refer to the layer signal having the relatively high power among the plurality of layer signals constituting the superposition coding signal, that is, an upper layer signal. The layer signal having a relatively low decoding success rate may refer to the layer signal having the relatively low power among the plurality of layer signals constituting the superposition coding signal, that is, a base layer signal.

For example, the signal processor 320 may restore bits corresponding to the upper layer signal by performing decoding on the upper layer signal having the relatively high power among the plurality of layer signals constituting the superposition coding signal having the reception power greater than or equal to the preset threshold value.

In this example, the receiver 300 may pre-store information about a coding method (for example, a coding rate, a length of a low density parity check (LDPC) code, and the like for LDPC coding) and a modulation method (for example, quadrature phase shift keying (QPSK), 16-quadrature amplitude modulation (QAM), and the like) which are performed to generate the upper layer signal in a transmitter (not shown). The receiver 300 may receive the information about the coding method and the modulation method from the transmitter.

In this example, the signal processor 320 may reproduce the upper layer signal by performing a process inversely corresponding to a process which is performed on the upper layer signal in the transmitter. For example, the signal processor 320 may reproduce the upper layer signal by performing encoding and modulation on the restored bits.

Next, the signal processor 320 may restore bits corresponding to the base layer signal by removing the reproduced upper layer signal from the superposition coding signal, and performing demodulation and decoding the superposition coding signal from which the upper layer signal is removed.

In this example, the receiver 300 may pre-store information about a coding method and a modulation method which are performed to generate the base layer signal in the transmitter or may receive the information about the coding method and the modulation method from the transmitter.

If a reception power for a superposition coding signal satisfies the preset condition, the signal processor 320 may perform decoding on the superposition coding signal in modulation and coding scheme (MCS) block units of a plurality of layer signals constituting the superposition coding signal.

The MCS block may be a block generated by coding and modulating bits to be transmitted from the transmitter according to a certain manner, and the MCS block may refer to a basic unit decoded in one loop of the SIC decoding.

For example, if an LDPC codeword having a length of 8192 is generated by performing LDPC coding on bits with a ⅔ code rate and modulation is performed on the LDPC codeword with a 16-QAM method in the transmitter, a set of modulation symbols generated through this method may refer to one MCS block.

Each of the layer signals may be configured of two or more MCS blocks. The MCS blocks may be generated by coding and modulating the bits through the same method or by coding and modulating the bits through different methods, FIG. 4 illustrates an example of MCS blocks constituting a layer signal, according to an exemplary embodiment.

Figure 4:
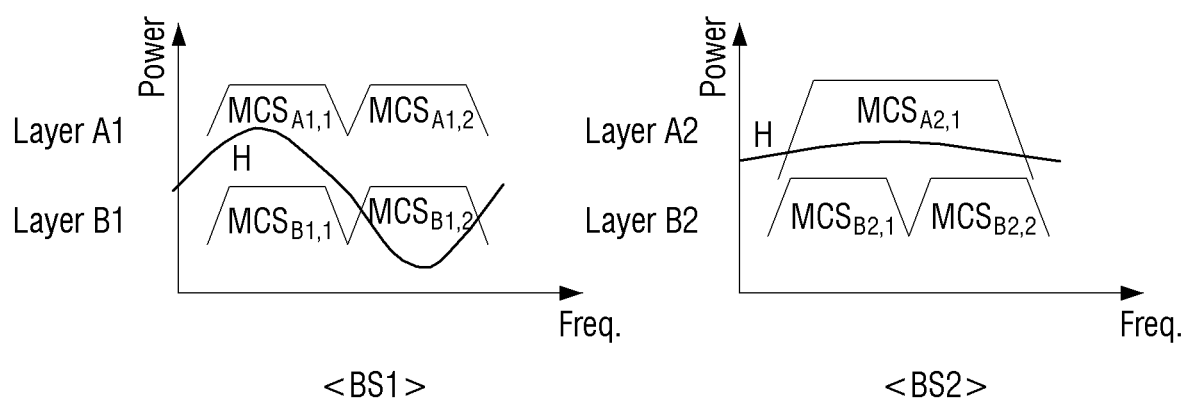
FIG. 4 is a diagram illustrating an example of a MCS block constituting a layer signal, according to an exemplary embodiment.

Referring to FIG. 4, frequency regions occupied by the MCS blocks in a layer signal may change according to a length of coded bits, a coding method, and a modulation method, and thus, the number of MCS blocks constituting one layer signal may change. A frequency selective fading channel may be affected by another channel according to the MCS block.

Accordingly, the signal processor 320 may perform decoding in MCS block units in a multiple base station environment, and detailed description thereof will be described with reference to FIG. 5.

Figure 5:
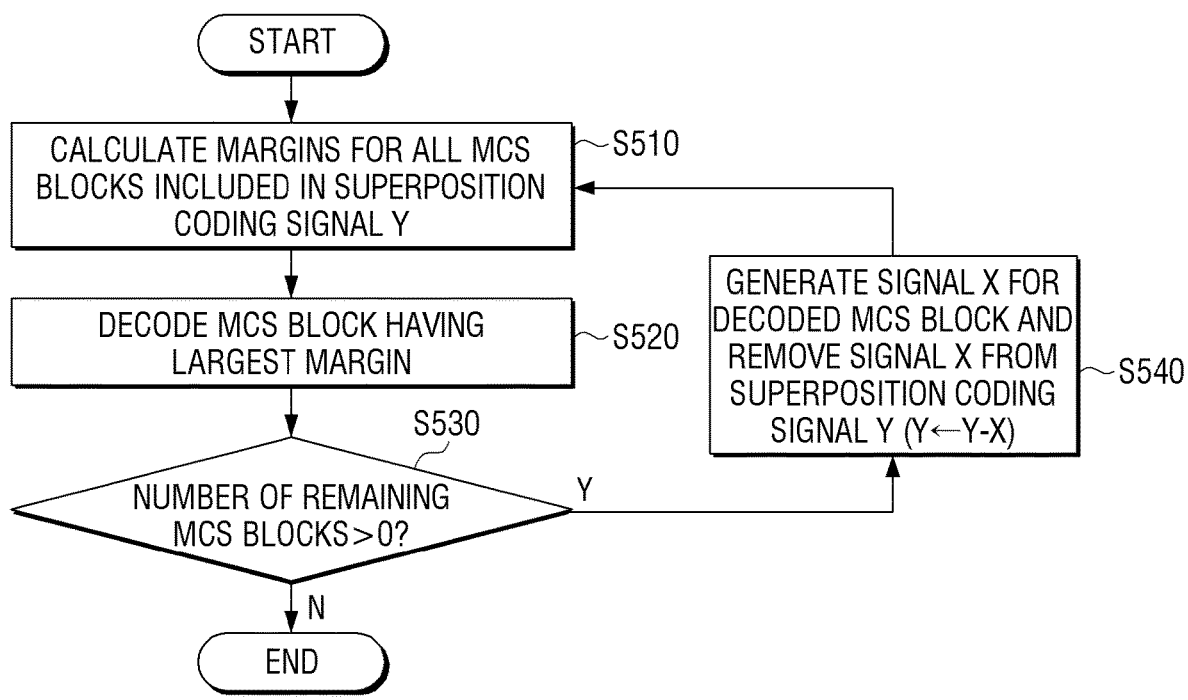
FIG. 5 is a flowchart illustrating a method of performing decoding in MCS block units, according to an exemplary embodiment.

FIG. 5 is a flowchart illustrating a method of performing decoding in MCS block units, according to an exemplary embodiment.

If reception powers of at least two superposition coding signals among a plurality of superposition coding signals received from a plurality of base stations are greater than or equal to a preset threshold value, the signal processor 320 may determine an order of MCS blocks to be decoded based on signal to interference ratios (SIRs) of MCS blocks of a plurality of layer signals constituting each of the superposition coding signals having the reception powers greater than or equal to the preset threshold value, and perform decoding on the MCS blocks according to the determined order.

The signal processor 320 may calculate SIR margins of the MCS blocks of the plurality of layer signals constituting each superposition coding signal Y having the reception power greater than or equal to the preset threshold value (S510).

For example, the SIR margin may refer to a magnitude degree of a reception SIR of a MCS block with respect to a minimum SIR (in this example, noise may be included as interference) required to obtain a decoding success rate for the MCS block. The SIR margin may be defined as a difference value between the reception SIR of the MCS block and the minimum SIR required for decoding of the MCS block.

That is, the SIR margin may be represented with reception SIR−$MCS_{Th}$.

The reception SIR may be a ratio of an interference signal power to a reception signal power, the reception signal power may be a reception power of the MCS block (for example, a reception power in consideration of a transmission power, a channel gain, and the like), and the interference signal power may include reception powers for other MCS blocks and a noise power of additive white Gaussian noise (AWGN).

The $MCS_{Th}$ may be the minimum SIR required in a system with respect to a coding method and a modulation method applied to the MCS block. For example, the $MCS_{Th}$ may be calculated through a simulation based on a channel environment to which the system is applied and the like. In another example, the $MCS_{Th}$ may be calculated by adding a constant value α calculated based on a certain criterion to the Shannon limit (that is, Shannon limit+α). In this example, the receiver 300 may pre-store an $MCS_{Th}$ value for each MCS block.

The signal processor 320 may calculate the SIR margin based on the following Equation 1.

$$\mathrm{margin}(i,j) = \frac{\|H_i\|^2 p_{i,j}}{(\Sigma_k \|H_k\|^2 \Sigma_l p_{k,l} - \|H_k\|^2 p_{i,j}) + \delta_n^2} - MCS_{Th}(i,j) \quad (1)$$

Here, $P_{i,j}$ is a reception power of a j-th layer signal of a superposition coding signal received from an i-th base station, $\|H_i\|$ is an average channel size of the superposition coding signal received from the i-th base station, $MCS_{Th}(i,j)$ is a threshold value for an MCS block of the j-th layer signal of the superposition coding signal received from the i-th base station, and $\delta_n^2$ is a variance of AWGN.

The signal processor 320 may perform decoding on the MCS blocks in the order of a MCS block having a large SIR margin.

For example, the signal processor 320 may perform decoding on a MCS block having the largest SIR margin (S520), and determine the number of remaining MCS blocks (S530).

In this example, the signal processor 320 may generate a signal for a decoded MCS block if the number of remaining MCS blocks is larger than zero (0), and remove the decoded MCS block from the superposition coding signal (S540). The signal processor 320 may perform decoding on all MCS blocks by repeating the above-described process until the number of remaining MCS blocks becomes zero (0).

For example, the signal processor 320 may generate a signal X for an MCS block by performing decoding and demodulation on the MCS block having the largest SIR margin, remove the signal X from the superposition coding signal Y, and update a superposition coding signal in which a SIR margin is to be calculated (Y→(Y−X)).

Subsequently, the signal processor 320 may perform decoding on an MCS block having the next largest SIR margin in the superposition coding signal from which the MCS block having the largest SIR margin is removed. The signal processor 320 may perform decoding on the superposition coding signal by repeating the above-described process until all MCS blocks are decoded.

To perform decoding on the MCS blocks, the receiver 300 may pre-store information about a coding method and a modulation method performed to generate each layer signal in a transmitter or may receive the information about the coding method and the modulation method from the transmitter.

FIGS. 6A to 7B are diagrams illustrating performance test results in response to the decoding method according to the present exemplary embodiment.

It may be assumed that two base stations transmit two layer signals. In graphs illustrated in FIGS. 6A to 7B, $P_i$ is power of a superposition coding signal received from a first base station in a receiver, and $P_2$ is power of a superposition coding signal received from a second base station in the receiver. The BLER is a block error rate.

A parameter for each layer signal of a base station is the same as the following Table 1.

TABLE 1

|  | Layer A | Layer B |
| --- | --- | --- |
| FFT size | 2048 | |
| Modulation method | QPSK | 16-QAM |
| Code rate | 1/4 | 2/3 |
| Length of LDPC code | 4096 | 8192 |
| Symbol number | 2048 | |
| Injection level | −3 dB, −5 dB | |

The injection level may refer to a power difference between layer signals constituting a superposition coding signal.

A transmitter (not shown) may generate a Layer A signal by performing LDPC coding on bits to be transmitted with a ¼ code rate and performing modulation on the coded bits with a QPSK method, generate a Layer B signal by performing LDPC coding on bits to be transmitted with a ⅔ code rate and performing modulation on the coded bits with a 16-QAM method, superpose the Layer A signal and the Layer B signal, and transmit the superposition coding signal to the receiver through a base station.

Figure 6B:
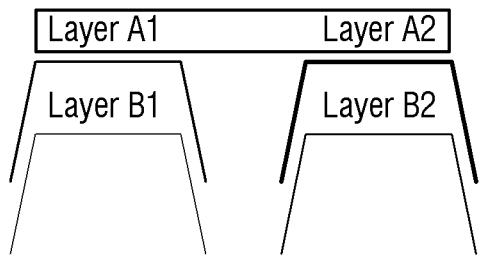
FIGS. 6A to 7B are diagrams illustrating performance test results in using a decoding method, according to exemplary embodiments.

FIGS. 6A and 6B are comparison graphs. FIG. 6A illustrates that decoding is performed using the decoding method according to the present exemplary embodiment, and FIG. 6B illustrates that decoding on upper layer signals Layer A1 and Layer A2 among superposition coding signals received from two base stations is performed, and then decoding is performed on base layer signals Layer B1 and Layer B2. That is, FIG. 6B illustrates that the decoding is performed on the upper layer signal having a relatively high reception power before the lower layer signal having a relatively low reception power.

As seen from the graph of FIG. 6A, the decoding method according to the present exemplary embodiment represents good performance rather than the decoding method of FIG. 6B.

Figure 7A:
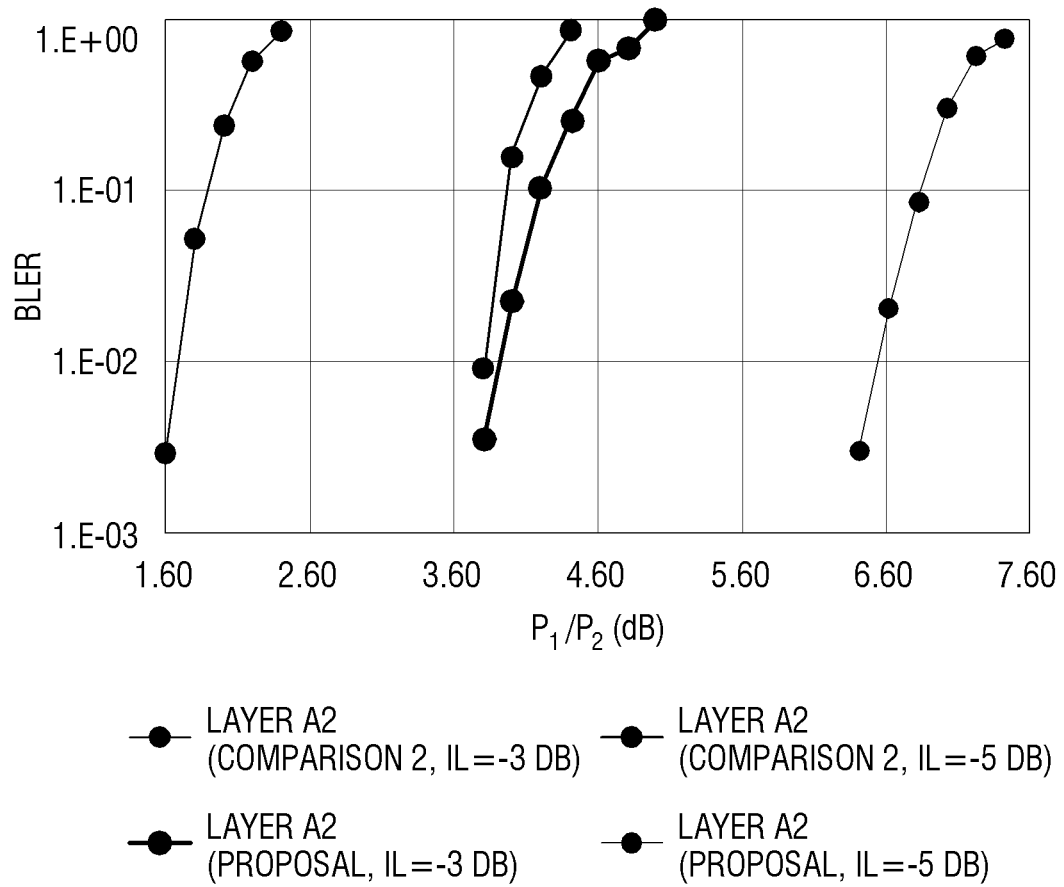
Figure 7B:
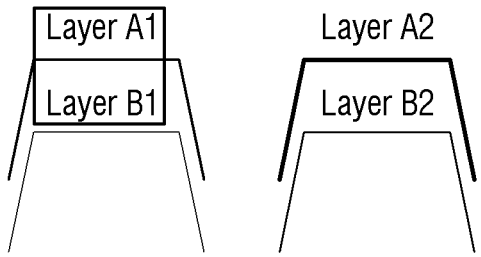

FIGS. 7A and 7B are comparison graphs. FIG. 7A illustrates that decoding is performed using the decoding method according to the present exemplary embodiment, and FIG. 7B illustrates that decoding is performed in the order of a superposition coding signal having a higher reception power among superposition coding signals received from two base stations. That is, FIG. 7B illustrates that the decoding on the superposition coding signal of the base station (BS) having a higher reception power is first performed.

It can be seen from the graph of FIG. 7A that as compared with decoding performance on a Layer A2 signal based on the injection level of −3 dB, the Layer A2 signal can be decoded up to P1/P2=2.5 dB if the decoding is performed as illustrated in FIG. 7B, but the decoding method according to the present exemplary embodiment can be performed on the Layer A2 signal up to about 4.7 dB. Accordingly, the decoding method according to the present exemplary embodiment may perform decoding on the Layer A2 signal up to wider coverage.

Figure 8:
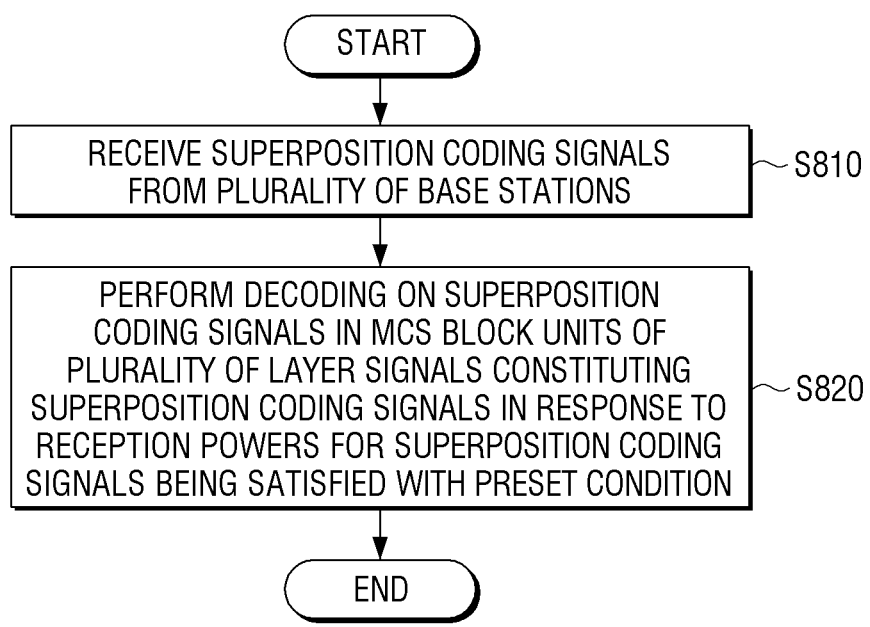
FIG. 8 is a flowchart illustrating a decoding method, according to an exemplary embodiment.

FIG. 8 is a flowchart illustrating a decoding method according to an exemplary embodiment.

First, a receiver may receive superposition coding signals from a plurality of base stations (S810).

If reception powers of the superposition coding signals satisfy a preset condition, the receiver may perform decoding on the superposition coding signals in MCS block units of a plurality of layer signals constituting each of the superposition coding signals (S820).

In operation S820, if reception powers of at least two superposition coding signals among the superposition coding signals received from the plurality of base stations are greater than or equal to a preset threshold value, the receiver may determine an order of MCS blocks to be decoded based on SIRs of MCS blocks of a plurality of layer signals constituting each of the superposition coding signals having the reception powers greater than or equal to the preset threshold value, and perform decoding on the MCS blocks according to the determined order.

The MCS blocks may be blocks generated by coding and modulating bits transmitted through a base station according to a certain manner.

In operation S820, the receiver may calculate SIR margins of the MCS blocks of the plurality of layer signals constituting each of the superposition coding signals having the reception powers greater than or equal to the preset threshold value, and perform decoding on the MCS blocks in the order of a size of the SIR margin.

The SIR margins may be difference values between reception SIRs of the MCS blocks and a minimum SIR required for decoding of the MCS blocks, and may be calculated based on above Equation 1 in operation S820.

In operation S820, if a reception power for any one of the superposition coding signals is greater than or equal to the preset threshold value and reception powers for remaining superposition coding signals are less than the preset threshold value, the receiver may perform decoding on a layer signal having a relatively high power among a plurality of layer signals constituting the superposition coding signal having the reception power greater than or equal to the preset threshold value, and then perform decoding on a layer signal having a relatively low power.

A non-transitory computer-readable medium in which a program for executing the decoding method according to the present exemplary embodiment is stored may be provided.

This non-transitory computer-recordable medium is not a medium configured to temporarily store data such as a register, a cache, or a memory but an apparatus-readable medium configured to permanently or semi-permanently store data. For example, the various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM) and provided.

A bus is not illustrated in the block diagram illustrating the receiver, but communication between configuration components in the receiver may be performed through the bus. A processor such as a central processing unit (CPU) or a microprocessor which performs the above-described various operations may be further included in the receiver 300 illustrated in FIG. 3 or implemented in the signal processor 320 of the receiver 300.

The foregoing exemplary embodiments and advantages are merely exemplary and are not to be construed as limiting the inventive concept. The present teaching can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A receiver comprising:
an antenna configured to receive superposition coding signals comprising a first layer signal and a second layer signal; and
a signal processor configured to decode the first layer signal and the second layer signal by a modulation and coding scheme (MCS) block unit,
wherein the first layer signal comprises first MCS blocks and the second layer signal comprises second MCS blocks,
wherein the signal processor is configured to calculate a signal to interference ratio (SIR) margin of a first MCS block from among the first MCS blocks, calculate a SIR margin of a second MCS block from among the second MCS blocks, determine a decoding order of the first MCS block and the second MCS block based on the calculated SIR margin of the first MCS block and the calculated SIR margin of the second MCS block, and decode the first MCS block and the second MCS block according to the determined decoding order,
wherein the SIR margin of the first MCS block is a difference between a reception SIR of the first MCS block and a minimum SIR required for decoding the first MCS block, and wherein the SIR margin of the second MCS block is a difference between a reception SIR of the second MCS block and a minimum SIR required for decoding the second MCS block.

2. The receiver of claim 1, wherein each of the first MCS block and the second MCS is a block generated by coding and modulating bits in a transmitter according to a predetermined coding and modulation scheme.

3. The receiver of claim 2, wherein the signal processor is further configured to decode the first MCS block and the second MCS block in order of the calculated SIR margins of the first MCS block and the calculated SIR margin of the second MCS block.

4. The receiver of claim 3, wherein each of the first MCS block and the second MCS block comprises bit groups having different coding and modulation characteristics, respectively.

5. The receiver of claim 3, wherein the signal processor is configured to calculate the SIR margin of the first MCS block and the SIR margin of the second MCS block based on a following equation:

$$\text{margin}(i, j) = \frac{\| H_i \|^2 p_{i,j}}{(\Sigma_k \| H_k \|^2 \Sigma_l p_{k,l} - \| H_k \|^2 p_{i,j}) + \delta_n^2} - MCS_{Th}(i, j),$$

where $P_{i,j}$ is a reception power of a j-th layer signal of a superposition coding signal received from an i-th base station, $\|H_i\|$ is an average channel size of the superposition coding signal received from the i-th base station, $MCS_{Th}(i,j)$ is a threshold value for an MCS block of the j-th layer signal of the superposition coding signal received from the i-th base station, and $\delta_n^2$ is a variance of additive white Gaussian noise (AWGN).

6. A decoding method of a receiver, the method comprising:
  receiving superposition coding signals comprising a first layer signal and a second layer signal; and
  decoding the first layer signal and the second layer signal by a modulation and coding scheme (MCS) block unit,
  wherein the first layer signal comprises first MCS blocks and the second layer signal comprises second MCS blocks,
  wherein the decoding comprises calculating a signal to interference ratio (SIR) margin of a first MCS block from among the first MCS blocks, calculating a SIR margin of a second MCS block from among the second MCS blocks, determining a decoding order of the first MCS block and the second MCS block based on the calculated SIR margin of the first MCS block and the calculated SIR margin of the second MCS block, and decoding the first MCS block and the second MCS block according to the determined decoding order,
  wherein the SIR margin of the first MCS block is a difference between a reception SIR of the first MCS block and a minimum SIR required for decoding the first MCS block, and
  wherein the SIR margin of the second MCS block is a difference between a reception SIR of the second MCS block and a minimum SIR required for decoding the second MCS block.

7. The method of claim 6, wherein each of the first MCS block and the second MCS block is a block generated by coding and modulating bits in a transmitter according to a predetermined coding and modulation scheme.

8. The method of claim 7, wherein the decoding decodes the first MCS block and the second MCS block in order of the calculated SIR margin of the first MCS block and the calculated SIR margin of the second MCS block.

9. The method of claim 8, wherein each of the first MCS block and the second MCS block comprises bit groups having different coding and modulation characteristics, respectively.

10. The method of claim 8, wherein the SIR margin of the first MCS block and the SIR margin of the second MCS block is calculated based on a following equation:

$$\text{margin}(i, j) = \frac{\| H_i \|^2 p_{i,j}}{(\Sigma_k \| H_k \|^2 \Sigma_l p_{k,l} - \| H_k \|^2 p_{i,j}) + \delta_n^2} - MCS_{Th}(i, j),$$

where $P_{i,j}$ is a reception power of a j-th layer signal of a superposition coding signal received from an i-th base station, $\|H_i\|$ is an average channel size of the superposition coding signal received from the i-th base station, $MCS_{Th}(i,j)$ is a threshold value for an MCS block of the j-th layer signal of the superposition coding signal received from the i-th base station, and $\delta_n^2$ is a variance of additive white Gaussian noise (AWGN).

11. The method of claim 6, wherein the decoding comprises:
  in response to a reception power of any one of the superposition coding signals being greater than or equal to a preset threshold value and reception powers for remaining superposition coding signals being less than the preset threshold value, decoding a layer signal having a relatively high power among a plurality of layer signals constituting the superposition coding signal having the reception power greater than or equal to the preset threshold value; and subsequently decoding a layer signal having a relatively low power.

* * * * *